(12) United States Patent
MacDougall et al.

(10) Patent No.: US 8,973,445 B2
(45) Date of Patent: Mar. 10, 2015

(54) MULTI-MODE HOLOGRAPHIC PRESSURE SENSOR

(75) Inventors: Trevor Wayne MacDougall, Simsbury, CT (US); Paul Eric Sanders, Madison, CT (US)

(73) Assignee: Qorex LLC, Rocky Hill, CT (US)

( * ) Notice: Subject to any disclaimer, the term of this patent is extended or adjusted under 35 U.S.C. 154(b) by 251 days.

(21) Appl. No.: 13/603,506

(22) Filed: Sep. 5, 2012

(65) Prior Publication Data

US 2014/0060199 A1     Mar. 6, 2014

(51) Int. Cl.
    *G01L 9/00*    (2006.01)
(52) U.S. Cl.
    USPC .............................................. 73/705
(58) Field of Classification Search
    USPC .................................... 73/700–756
    See application file for complete search history.

(56) References Cited

U.S. PATENT DOCUMENTS

| 4,768,886 A * | 9/1988 | Hirschfeld et al. ........... 374/161 |
| 7,003,184 B2 | 2/2006 | Ronnekleiv et al. |
| 2002/0041723 A1 | 4/2002 | Ronnekleiv et al. |
| 2010/0180686 A1* | 7/2010 | Kramer et al. ................... 73/705 |
| 2011/0048136 A1* | 3/2011 | Birch et al. ...................... 73/705 |

OTHER PUBLICATIONS

Daniele Inaudi and Branko Glisic, "Integration of distributed strain and temperature sensors in composite coiled tubing", SPIE Smart Structures and Materials Conference in San Diego, Feb. 27, Mar. 2, 2006, pp. 1-10, SMART SA, Via Pobiette 11, CH-6928 Manno, Switzerland.

* cited by examiner

*Primary Examiner* — Andre Allen
(74) *Attorney, Agent, or Firm* — McCormick, Paulding & Huber LLP

(57) ABSTRACT

A holographic pressure sensing apparatus includes a first optical fiber with a diffractive element at its end face, and a light-coupling component for receiving from the first optical fiber end face first and second images respectively formed by interaction with the diffractive element of a first light of a first wavelength and a second light of a second wavelength. Displacement of the light-coupling component, toward or away from the first optical fiber end face, will adjust an overlap of the first and second images, such that a change in a measurement of said overlap will indicate a change of the pressure in the fluid surrounding the casing.

19 Claims, 4 Drawing Sheets

$$(\theta 1d) := \frac{\lambda 1}{\Lambda} + \sin(\theta_i)$$

$$(\theta 2d) := \frac{\lambda 2}{\Lambda} + \sin(\theta_i)$$

$$e(d) := \frac{(dreceiver)^2}{(dsource + 2 * d * \tan(\theta_i))^2}$$

$$e1(d) := \frac{\sin(\theta_i)(dreceiver)^2}{\sin(\theta 1d)(dsource + 2 * d * \tan(\theta 1d))^2}$$

$$e2(d) := \frac{\sin(\theta_i)(dreceiver)^2}{\sin(\theta 2d) * (dsource + 2 * d * \tan(\theta 2d))^2}$$

FIG. 5

MULTI-MODE HOLOGRAPHIC PRESSURE SENSOR

BACKGROUND

1. Field of the Invention

Embodiments of the invention relate to remote sensing of temperature and/or pressure. Particular embodiments relate to simultaneous optical sensing of temperature and pressure.

2. Discussion of Art

Optical distributed temperature sensors, commonly referred to as "DTS" systems, based on fiber optic sensing techniques are being used broadly in a number of applications and markets, including by way of example oil and gas wellbores, power distribution fault monitoring, and fire detection. These sensors use optical time delay reflectometry (OTDR), to measure temperature-encoded backscattered light signals propagating in the fiber to derive temperature at distinct positions all along the fiber. This allows a fully distributed temperature sensing architecture of which a number of applications particularly benefit of broad coverage such as pipelines, bridges, tunnels and oil and gas wells as examples With DTS, high intensity pulsed laser energy is launched into a sensing fiber to stimulate nonlinear effects that cause light scattering. Optical DTS systems have been built based on Raman effects and other optical DTS systems have been built based on Brillouin effects, each producing both forward (Stokes) and backward (anti-Stokes) frequency-shifted signals or images in which their relative intensity ratio (in Raman systems) and/or combined Doppler shift (in Brillouin systems) is dependent on temperature. Raman effects and Brillouin effects are discussed in the paper, Daniele Inaudi and Branko Glisic, "Integration of distributed strain and temperature sensors in composite coiled tubing", 2006 SPIE Smart Structures and Materials Conference, San Diego, Calif., Feb. 27 to Mar. 2, 2006, (Authors from SMARTEC SA, Via Pobiette 11, CH-6928 Manno, Switzerland, www.s-martec.ch).

Of the nonlinear DTS sensors, the use of Raman type far exceeds that of the Brillouin type by virtue of the Raman effect, being photoelectric, is sensitive to temperature only, as compared to the Brillouin effect, being acoustic, that is sensitive to both temperature and strain. It is difficult to discriminate between these two parameters, thus the Brillouin effect requires complete isolation of fiber strain in order to support temperature measurement. Raman systems, being intensity-based, can operate on either single mode or multimode optical fibers. Telecom-grade graded index multimode fibers are used almost exclusively in Raman scattering applications, as the larger Raman cross-section and higher numerical aperture of such multimode fibers, compared to single mode fibers, yields greater intensity of backscattered signals, and greater collection of these signals The Raman OTDR-based DTS operating on graded index multimode fibers is therefore the most common platform, and used almost exclusively across all applications. Oil and gas well monitoring systems have emerged as a very important application for these sensors, in which temperature and pressure information are primary physical parameters used by oil and gas producers to manage these wells. A common sensing architecture has a DTS sensing fiber installed directly along the well production tubing or casing, with a bottom-hole pressure gauge, either optical or electronic, connected by a transmission cable running as well to the surface instrumentation unit. The limitation of electronic gauge upper operating temperature has led to the proliferation of higher temperature rated optical pressure gauges in many such Oil and Gas well monitoring systems While delivering suitable temperature/pressure data, both the all-optical and hybrid systems increase the complexity of the surface interrogation system, requiring separate interrogation instruments for DTS and pressure monitoring, but more importantly require multiple cables- either optical or hybrid, and associated multi-pin penetrations through packers and other well completion parts that add significantly to cost, complexity and difficulty installing and maintaining these systems.

Therefore, there has been for a long time a keen desire to operate both the DTS and pressure gauge along the same fiber to realize the benefits of a single fiber cable, single-pin downhole system in these wells. Unfortunately, known commercial optical pressure gauges suitable for downhole performance operate exclusively on single mode fibers that are incompatible with the common multimode Raman platform used extensively by this industry. Thus, there has been a longstanding need for a suitable pressure sensor that is operable on multimode optical fiber for seamless integration with the common Raman DTS platform. Such integration would provide a full well monitoring suite that couples DTS with bottom-hole pressure sensing, operating on a single cable/single penetration downhole system. Associated cost savings extend not only to the equipment, but also to reduction of complexity when installing a single cable system There are not presently known to be any multimode optical pressure gauges in the commercial stream that are rated for the measurement performance and operating temperature/pressure conditions of subsurface oil and gas wells. Current optical pressure sensing solutions operate exclusively on single mode fibers due to the measurement principles employed, either phase gratings (Bragg gratings) or interferometric methods, which require single mode transmission to maintain signal information transmitted from the sensor to the surface instrument.

SUMMARY OF THE INVENTION

In aspects of the invention, a holographic pressure sensing apparatus includes a first multimode optical fiber, which has a diffractive element at an end face of the first optical fiber. At least one light source is provided for transmitting through the first optical fiber light comprising a first wavelength and a second wavelength. The apparatus also includes a light-coupling component separate from the first optical fiber and offset from the diffractive element by a separation distance. The light-coupling component is positioned to receive first and second images that are respectively formed by interaction with the diffractive element of said first and second wavelengths of light. The first optical fiber and the light-coupling component are enclosed and connected by a deformable casing configured such that a change of pressure in a fluid surrounding this casing will displace the light-coupling component relative to the first optical fiber. The apparatus further includes first and second light sensors for respectively receiving from the first optical fiber first and second reflected images respectively formed by reflection of said first and second images from the light-coupling component through the diffractive element. Relative displacement of the light-coupling component will adjust an overlap of the first and second images, such that a change in a measurement of the overlap will indicate a change of the pressure in the fluid surrounding the casing In other aspects, at least one of a temperature and a pressure measurement can be determined at a given location, by illuminating an optical fiber with light of first and second wavelengths, then measuring a first intensity ratio, due to interaction with a first diffractive element at a first location, of first and second images corresponding to the first and second wavelengths of light. Based on the first intensity ratio, a pressure at the first location can be computed In other aspects, a holographic pressure sensing apparatus includes a first optical fiber with a diffractive element at its end face, and a light-coupling component for receiving from the first optical fiber end face first and second images respectively formed by interaction with the diffractive element of a first light of a first wavelength and a second light of a second wavelength. Displacement of the light-coupling component, toward or away from the first optical fiber end face, will adjust an overlap of the first and second images, such that a change in a measurement of said overlap will indicate a change of the pressure in the fluid surrounding the casing These and other features of the invention will be better understood with reference to the following descriptions of drawings that illustrate exemplary and non-limiting embodiment(s) of the invention.

BRIEF DESCRIPTION OF THE DRAWINGS

FIG. 5 shows equations characterizing the graphs shown in FIGS. 3 and 4

DETAILED DESCRIPTION OF DRAWINGS

Figure 1:
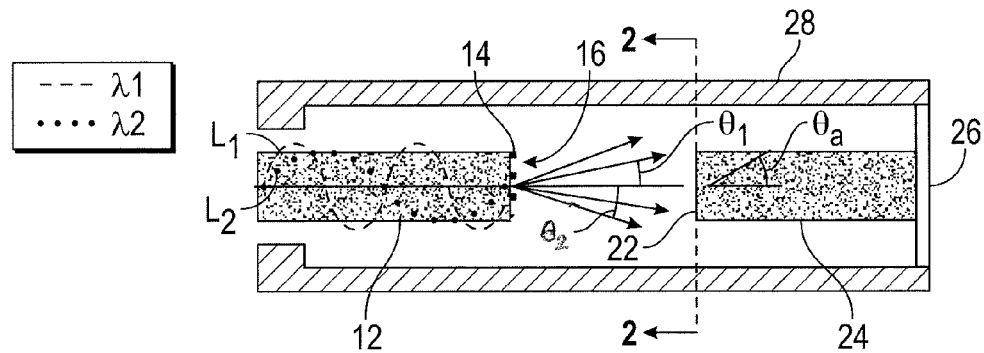
FIG. 1 shows in schematic view an optical pressure sensor, according to an embodiment of the present invention

Referring to FIG. 1, in one embodiment, a combined temperature and strain sensor 10 measures variation of an ambient pressure p based on image transformation and differential transmission of coincident light beams L1, L2 that are transmitted through a first multimode optical fiber 12 at two different respective wavelengths $\lambda 1$, $\lambda 2$.

Figure 2:
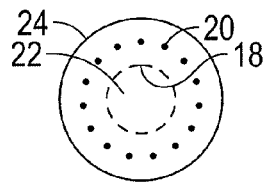
FIG. 2 shows in schematic view a radial section, along view line 2-2, of the sensor shown by FIG. 1

Referring to FIGS. 1 and 2, the light beams L1, L2 exit the first optical fiber 12 via a holographic or diffractive optical element 14 that is permanently scribed or patterned on an end-face 16 of the first multimode fiber. The diffractive element 14 presents a wavelength-dependent numerical aperture, such that the two coincident light beams L1, L2 exit the fiber end-face 16 at respective spread angles $\theta 1$, $\theta 2$. Therefore, the light beams L1, L2 are imaged onto distinct respective regions 18, 20 at an end face 22 of a receiving or light-coupling component 24, which is separated by a distance d from the end face 16 of the first fiber 12.

Referring back to FIG. 1, the receiving component 24 may consist of a second multimode optical fiber, or optionally may include additional parts such as a gold film reflector 26. The first fiber 12 and the receiving component 24 are housed together within a case 28, which is sealed to maintain a pre-set internal pressure p0

The inventive sensor measures variations of the ambient pressure p, based on differential coupling of the light beams L1, L2 with the receiving component 24.

Referring again to FIGS. 1 and 2, divergences $\theta 1$, $\theta 2$ of each light beam at the holographic component 14 will cause distinct portions of each light beam L1 or L2 to be within an acceptance angle $\theta a$ of the receiving component 24. The acceptance angle $\theta a$ can be determined based on the refractive index of the first fiber 12 and of the receiving component 24, and also based on geometry of the end faces 16 and 22. In a simple case each end face 16 and 22 is planar, specifically an optically cleaved plane orthogonal to the axis of light propagation, while the first fiber 12 has a same refractive index as the receiving component 24.

Figure 3:
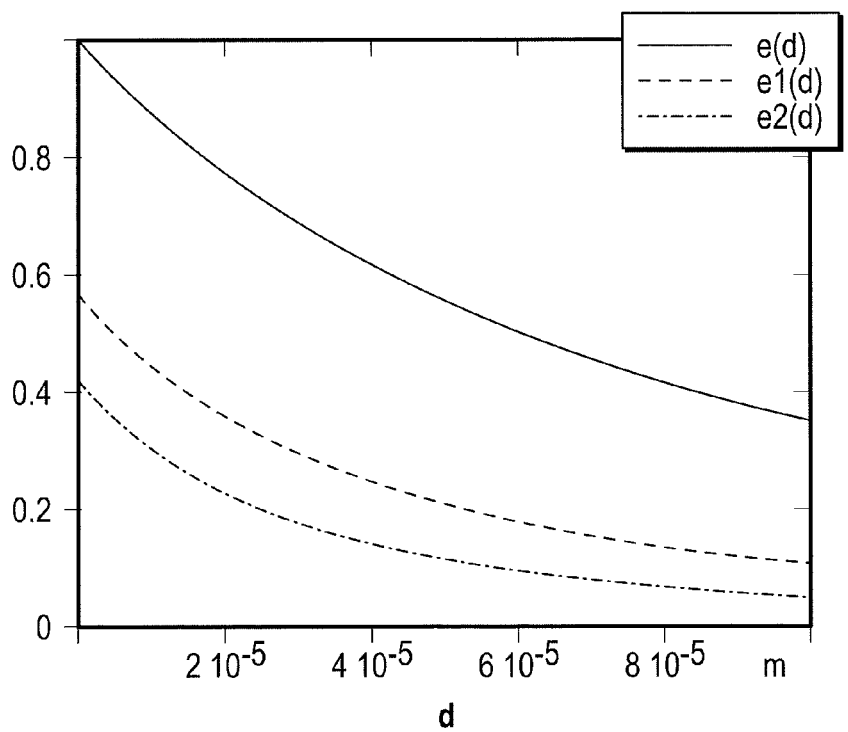
FIG. 3 is a graph showing light transmission efficiencies for two distinct wavelengths, as a function of a separation distance within the sensor shown by FIG. 1
Figure 4:
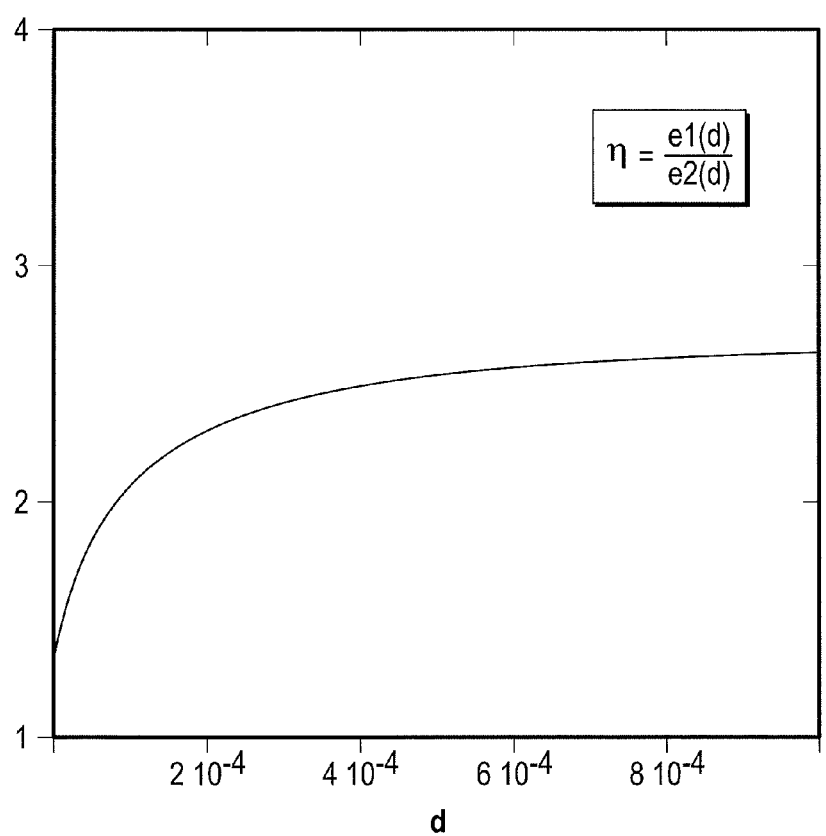
FIG. 4 is a graph showing a transmission efficiency ratio between the two distinct wavelengths, as a function of a separation distance within the sensor shown by FIG. 1

Thus, in a case where the end faces 16 and 22 abut, the light beam L1 at wavelength $\lambda 1$ will be coupled into the receiving component 24 at a baseline transmission efficiency e1,0 while the light beam L2 at wavelength $\lambda 2$ will be coupled into the receiving component at a different baseline transmission efficiency e2,0. Moreover, the different divergence or spread angles $\theta 1$, $\theta 2$ cause each light beam L1 or L2 to exceed the end face 22 area by a different portion as a function of the separation distance d. FIG. 3 shows transmission efficiencies e1 and e2 relative to the separation distance d, for exemplary values of $\lambda 1$=850 nm and $\lambda 2$=1550 nm, with the diffractive element 14 having a lattice period $\Lambda$=5000 nm. Meanwhile, FIG. 4 shows as a function of the separation distance d a transmission efficiency ratio $\eta$ that is calculated as e1/e2. FIG. 5 presents equations that will be understood as defining the optical and geometric relationships of $\theta 1$, $\theta 2$, $\eta$, and d with reference to optical diameters of the first fiber 12 and of the light-coupling component 24.

Referring back to FIG. 2, the transmission efficiency ratio $\eta$ can also be considered as a measure of "overlap" between the distinct images 18, 20, with $\eta$ approaching 1.0 as the images 18, 20 approach each other in size. Presuming that light beams L1, L2 are originally transmitted at known intensities, preferably at equal intensities, then $\eta$ can be measured to obtain a numeric value corresponding to the separation distance d.

Keeping in mind that any variation of the hydrostatic ambient pressure p compresses or relaxes the case 28 to alter the separation distance d between the source fiber 12 and the receiving or light-coupling component 24, then it is possible to ascertain p from measurement of $\eta$.

For additional sensitivity, the coupled light beams L1, L2 may be retransmitted from the reflector 26 back through the receiving component 24 and the holographic element 14, thereby multiplying the transmission efficiency ratio $\eta$, thereby amplifying the sensed variation of the ambient pressure p.

Of course, variations of an ambient temperature T also will cause variations of the separation distance d, however, temperature can be separately sensed within the first fiber 12 at a location proximate the end face 16, as discussed for example in co-pending U.S. patent application Ser. Nos. 13/209,015 and 13/208,910. By monitoring the ambient temperature T along with the varying transmission efficiency ratio of the two light beams L1, L2, the magnitude of pressure p that modulates the separation distance d can be recorded. Pre-commissioning calibration of the separation distance d to temperature and strain effects can be useful for constructing sensor devices to meet a range of applications.

In one embodiment, the sensor 10 includes the first multimode optical fiber 12, such as a telecom-grade 50/125 um optical fiber, with the diffractive optical element 14, such as an echelle grating, imprinted on the end-face 16 of the fiber.

The diffractive element 14 can be produced using a number of methods. Controlled splitting and recombining UV laser energy for a controlled standing interference pattern on the end face of the fiber will allow fine grating periods. More common IR lasers used in glass machining, such as $CO_2$ lasers, can be scanned over the fiber target using small slits to pattern the grating with fine features. Other techniques include, for example, lithographic etching, or volume phase holography of a photosensitive gel.

The fiber 12 is inserted, attached and held within the deformable casing 28 (for example a metal sleeve or glass tubing), with direct communication to a light-coupling component, including either or both of a reflective element such as a gold film mirror 26, or a transmissive component such as the second optical fiber 24. The deformable casing 28 can be polymer, metal, or glass, and can be attached to the first fiber 12 using photonics packaging attachment materials and techniques such as epoxies, solders, or fusion welding. The light-coupling component 24 and/or 26 then is fixed within the deformable casing 28 using one or more of these same techniques, and the casing is sealed at a pre-determined internal pressure p0 with a prescribed separation d between the first fiber 12 and the light-coupling component 24. In such a configuration it is understood that the end effects of the package will dominate and that the separation distance d will decrease as ambient pressure p increases outside the casing 28.

Figure 6A:
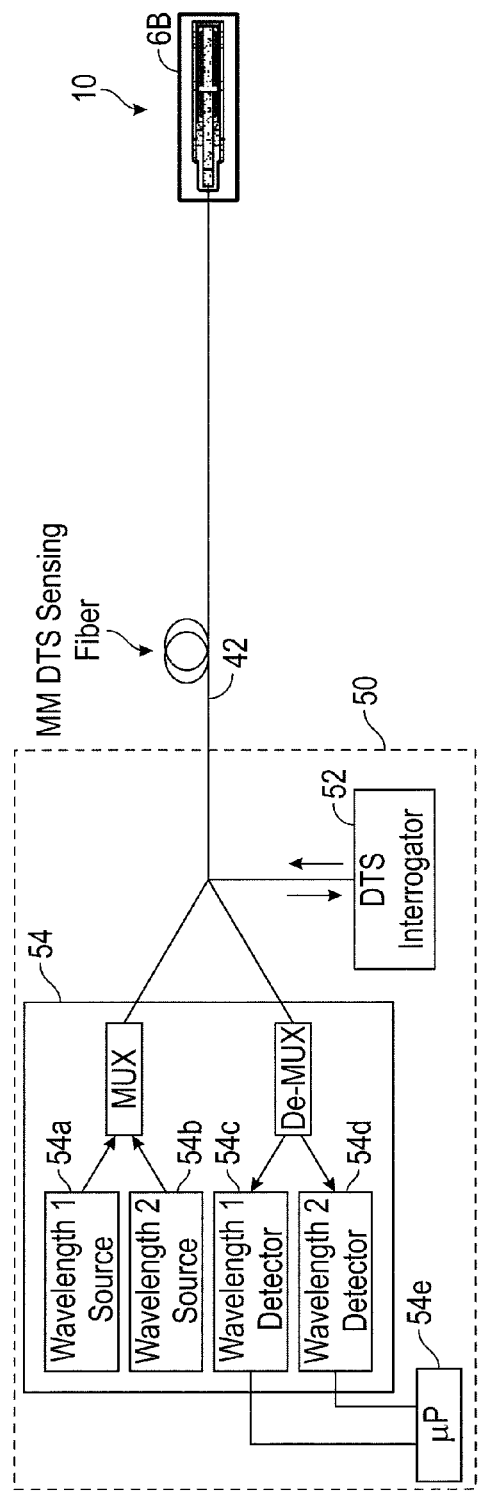
FIG. 6 shows in schematic view a downhole sensor package incorporating the sensor shown by FIG. 1.
Figure 6B:
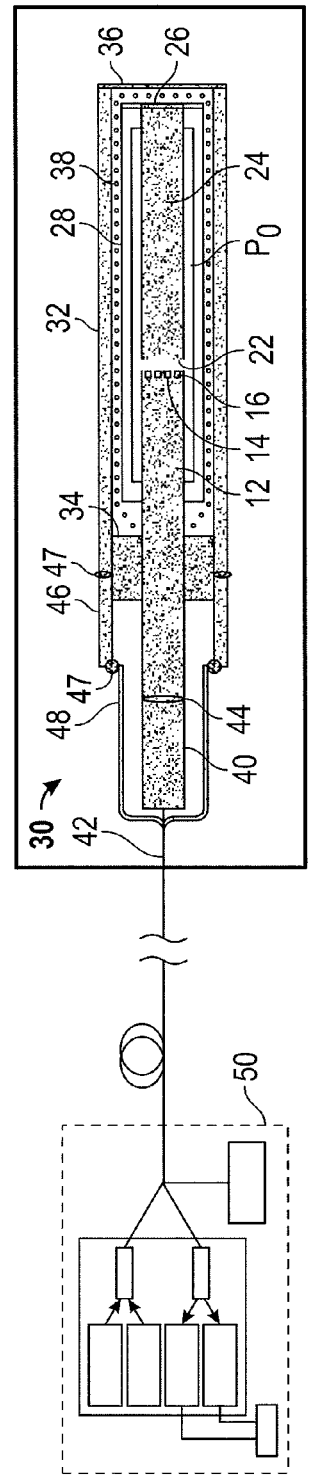

Referring to FIG. 6, the sensor 10 can be packaged in a generally cylindrical gauge housing 30 that has a relatively rigid periphery 32 with a pressure seal 34 at a proximal end and a flexible pressure diaphragm 36 at the other distal end. The housing 30 is filled with a gel or fluid 38, which transmits hydrostatic pressure p to the deformable casing 28 while also preventing contact of potentially corrosive environment fluids onto the sensor 10.

At its proximal end, the first fiber 12 is joined to a proximal end of a fiber 40 of a standard DTS (distributed temperature sensing) cable 42 by a fusion splice 44. The splice 44 is enclosed within a splice sleeve 46 that is welded at points 47 to the cable jacket 48 and to the gauge housing 30. At its end distal from the sensor 10, the fiber 40 is connected with a combined pressure/temperature instrument 50 that incorporates standard DTS software along with algorithms for measuring and processing variations of η due to changes of pressure p adjacent the sensor 10.

For example, in the embodiment shown in FIG. 6, the instrument 50 includes a common Raman DTS interrogator 52 having a first light sensor connected in communication with a computing device that is configured with standard DTS software, along with an auxiliary source module 54 having first and second wavelength light sources 54a, 54b as well as first and second wavelength light sensors 54c, 54d connected in communication with a computing device 54e that is configured with optical pressure sensing software.

Thus, source signals from the instrument 50 are transmitted down the fibers 40 and 12, through the diffractive element 14, coupled into the receiving component 24, and reflected back from the film reflector 26 through the diffraction grating 14 and back up the source fibers 12 and 40 to the instrument 50. In the reflection mode, variation of the transmission efficiency ratio η is enhanced by propagating signals twice over the diffractive optics 14 for a more sensitive response. The Raman DTS interrogator 52 measures temperature based on a relative intensity ratio of Stokes and anti-Stokes frequency shifts of at least one of the first or second light beams L1, L2. The auxiliary source module 54 measures pressure based on changes in the overlap of the first and second images 20, 22, for example, based on a relative intensity ratio of the first and second wavelengths $\lambda 1$, $\lambda 2$ as received at the auxiliary source module. Other means for measuring the image overlap may be provided, for example, first and second arrays of photodiodes respectively responsive to wavelengths near the first and second wavelengths $\lambda 1$, $\lambda 2$. However, an intensity ratio mode of measurement is advantageous as this mode corresponds to what is done by the Raman interrogator 52. Thus, when intensity ratios are used for measurement both of temperature and pressure, it is feasible to combine the Raman module 52 and the auxiliary source module 54 into a unit sensor that produces one or more signals processed by distinct hardware/software filters for use by temperature and pressure algorithms.

Since the diffraction grating 14 creates an image transformation that manifests as a wavelength dependent numerical aperture (NA) and thus a wavelength dependent transmission loss as a function of separation distance d, the intensities received at the auxiliary source module 54 are different for the two wavelengths $\lambda 1$, $\lambda 2$. If these two separate signals are compared and the ratio η of received light intensity is measured, the pressure value p can be determined as explained above. For example, FIGS. 3 and 4 can be implemented as formulas or as lookup tables within the auxiliary source module 54. In monitoring the ratio of power between the two wavelengths, and with both wavelength signals transmitted/received on the same optical fiber, the configuration provides automatic rejection of common mode noise and error sources such as mechanical bending and other perturbations that can cause a change in fiber attenuation.

In select embodiments of the invention, the sensor 10 is integrated with and operates on the same sensor fiber as a Raman DTS (distributed temperature sensor), in which the Raman instrument 52 acquires temperature information for a location at or near (e.g., within 1 to 1000 wavelengths distant from) the diffractive element 14. Thus, temperature near the diffractive element 14 is monitored to compensate for thermally-induced changes in the fiber refractive index and thermal expansion of the device. In select embodiments, design of the hologram or diffractive optic 14 can be tailored to exploit dn/dT and CTE of the Raman device so as to normalize and reduce sensitivity of the sensor 10 to thermally-induced measurement error.

The proposed solution described within this disclosure exploits the wavelength dependence created by the diffraction grating 14 that is imprinted onto the end of the source fiber. This grating can be created using techniques such as etching or various exposure techniques to create the periodic index modulation. Wavelength dependence of the grating 14 is exploited to impart a wavelength dependent loss within the sensor 10, creating a response that is intensity modulated but possesses common mode rejection by employing two wavelengths.

It should be understood that the foregoing description is only illustrative of the invention. Various alternatives and modifications can be devised by those skilled in the art without departing from the broader aspects of the present invention.

What is claimed is:
1. A holographic pressure sensing apparatus comprising:
an optical fiber having an end face, said optical fiber being a multimode optical fiber;
a diffractive element at the end face of the optical fiber;
at least one light source for transmitting through the optical fiber light comprising a first wavelength and a second wavelength;

a light-coupling component separate from the optical fiber and offset from the diffractive element by a separation distance, said light-coupling component positioned to receive first and second images that are respectively formed by interaction with the diffractive element of said first and second wavelengths of light;

a casing enclosing and connecting the optical fiber and the light-coupling component, said casing configured such that a change of pressure in a fluid surrounding said casing will displace the light-coupling component relative to the optical fiber; and first and second light sensors for respectively receiving from the optical fiber first and second reflected images respectively formed by reflection of said first and second images from the light-coupling component through the diffractive element; and wherein such relative displacement of the light-coupling component will adjust an overlap of the first and second images, such that a change in a measurement of said overlap will indicate a change of the pressure in the fluid surrounding the casing.

2. An apparatus as claimed in claim 1, wherein the diffractive element is etched or inscribed into the end face of the optical fiber.

3. An apparatus as claimed in claim 1, wherein the diffractive element is patterned onto the end face of the optical fiber.

4. An apparatus as claimed in claim 1, wherein the diffractive element is permanently mounted at the end face of the optical fiber.

5. An apparatus as claimed in claim 1, wherein the measurement of the overlap is obtained as a ratio of intensities of the first and second reflected images.

6. An apparatus as claimed in claim 5, wherein the at least one light sensor is a multi-mode light sensor that includes a first module configured to measure the ratio of intensities of the first and second reflected images, and configured to compute from the ratio of intensities a value of the pressure surrounding the casing.

7. An apparatus as claimed in claim 6, wherein the multi-mode light sensor also includes a second module that is configured to detect a Raman shift of a third wavelength of light, and to compute from the Raman shift a value of temperature proximate the casing.

8. An apparatus as claimed in claim 7, wherein the first module of the multi-mode light sensor is further configured to query the second module, and to adjust the computed pressure value based on the computed temperature value.

9. A method for determining at least one of a temperature and a pressure at a given location, said method comprising:
illuminating an optical fiber with light of first and second wavelengths;
measuring a first intensity ratio, due to interaction with a diffractive element at a first location, of first and second images corresponding to the first and second wavelengths of light; and
computing a pressure at the first location, based on the first intensity ratio,
wherein the first location is at an end face of the optical fiber.

10. A method as claimed in claim 9, further comprising:
measuring a Raman shift of light of a third wavelength, at or near the first location;
computing a temperature at the first location, based on the Raman shift; and
correcting the computed pressure, based on the computed temperature.

11. A method as claimed in claim 10, wherein the third wavelength is different from the first or second wavelengths.

12. A method as claimed in claim 9, the first wavelength being about half of the second wavelength.

13. A method as claimed in claim 9, the first wavelength being about 850 nm and the second wavelength being about 1550 nm.

14. A method as claimed in claim 9, wherein the first and second images are reflected from a light-coupling component that is spaced apart from the diffractive element by a separation distance, wherein computing a pressure includes a step of calculating the separation distance based on the measured intensity ratio of the reflected images.

15. A method as claimed in claim 14, further comprising:
measuring a Raman shift of light of a third wavelength, at or near the first location;
computing a temperature, based on the Raman shift; and
correcting the computed pressure, based on the computed temperature.

16. A method as claimed in claim 15, wherein the third wavelength is different from the first and second wavelengths.

17. A holographic pressure sensing apparatus comprising:
an optical fiber having an end face, said optical fiber being a multimode optical fiber;
a diffractive element at the end face of the optical fiber; and
a light-coupling component for receiving from the optical fiber end face first and second images respectively formed by interaction with the diffractive element of a first light of a first wavelength and a second light of a second wavelength;
wherein displacement of the light-coupling component, toward or away from the optical fiber end face, will adjust an overlap of the first and second images, such that a change in a measurement of said overlap will indicate a change of the pressure in the fluid surrounding the casing.

18. An apparatus as claimed in claim 17, further comprising a module optically communicating with the light-coupling component for measuring the overlap of the first and second images.

19. An apparatus as claimed in claim 18, wherein the module includes first and second light sources for providing the first and second lights, first and second light sensors for measuring areal intensities of the respective first and second images, and a computing device for estimating the overlap and the change of pressure based on a ratio of the measured areal intensities.

* * * * *